July 14, 1942.  W. R. GORIS  2,290,100
LENS
Filed Aug. 30, 1940  2 Sheets-Sheet 1

Inventor
William R. Goris
By Blackmore, Spencer & Flint
Attorneys

July 14, 1942. W. R. GORIS 2,290,100
LENS
Filed Aug. 30, 1940 2 Sheets-Sheet 2

Inventor
William R. Goris
By Blackmore, Spencer & Flint
Attorneys

Patented July 14, 1942

2,290,100

UNITED STATES PATENT OFFICE 2,290,100

LENS

William R. Goris, Anderson, Ind., assignor to General Motors Corporation, Detroit, Mich., a corporation of Delaware Application August 30, 1940, Serial No. 354,854

4 Claims. (Cl. 177—329)

This invention has to do with lenses, particularly lenses for use in automobile lamps such as stop light and direction signals where a beam of high intensity is required to attract the attention of other drivers. The invention is an improvement in lenses of the type described and claimed in the patent to Dickson, No. 1,944,154, granted January 23, 1934. Such lenses are characterized by catadioptric portions surrounding a central dioptric portion and serving by refraction and internal reflection to concentrate more of the light along the axis of the lens. While concentration of light is desired it is also important to obtain a certain amount of spread so that vehicles to one side or somewhat above or below the vehicle carrying the signal may be in the path of the beam. To obtain the desired spread it has been customary to provide vertical spreading flutes on the outer surface of the lens as disclosed in the Dickson patent thereby obtaining the desired spread in a lateral direction; or to give a toroidal curvature to the reflecting surface of the lens but this is unsatisfactory in that when viewed from the wider angles only a portion of the surface of the lens appears to be illuminated.

I have found that the desired spread may most satisfactorily be obtained by providing flutes for spreading light on both sides of the lens axis and at the same time substantially tangentially of the dioptric or catadioptric rings. These flutes may be convex, concave or even flat if the cooperating reflecting or refracting surface has the necessary curvature to give the desired spread. The flutes may be so designed that each gives the same angular spread tangentially and as the flutes are arranged about the axis of the lens a center uniform spread of light is obtained.

With the improved design of lens the entire lens area appears to be illuminated when viewed from wide angles, both laterally and vertically. The angle or spread may be varied as desired by giving the flutes the proper curvature.

In the form shown in Figures 1 to 4 the invention is applied to the catadioptric portion only of the lens.

Figure 1:
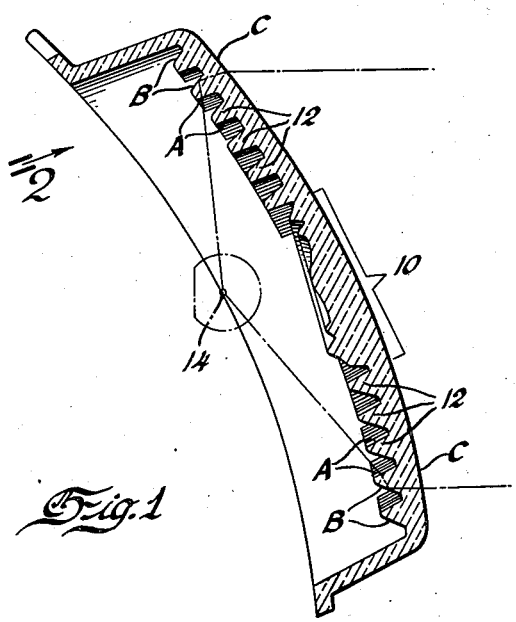
Figure 1 is a vertical section through a stop light lens embodying my invention with the light source indicated in dotted lines.
Figure 2:
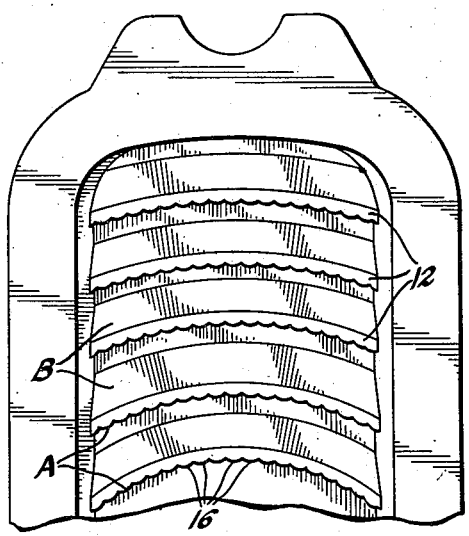
Figure 2 is a fragmentary view looking in the direction of the arrow 2 of Figure 1.
Figure 3:
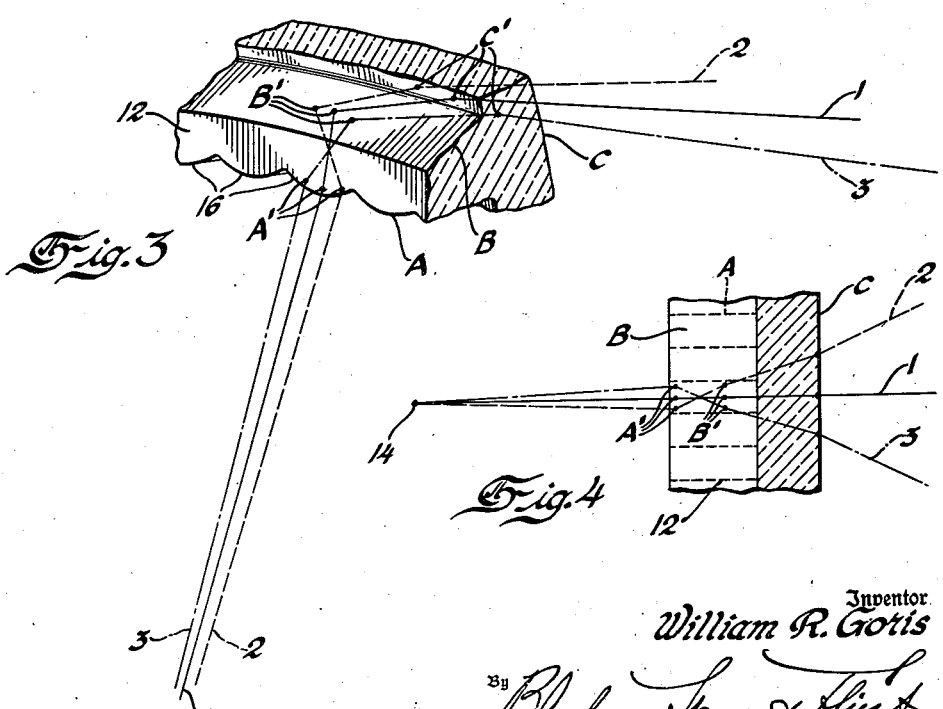
Figure 3 is a fragmentary perspective view showing a portion of one of the catadioptric lens elements.

Referring now to Figure 1 the dioptric portion of the lens is indicated by the bracketed portion 10. The remainder of the lens is composed of catadioptric lens elements marked 12. The source of light, usually an incandescent filament, is marked 14.

The incident surface of the catadioptric lens elements is marked A, the reflecting surface is marked B and the surface from which the reflected light emerges is marked C. It will be noted from the rays illustrated in Figure 1 that the light from the source 14 enters the catadioptric lens elements through surface A, is refracted and then reflected from surface B, passing out through surface C where it is again refracted. The net result of refraction and reflection is to cause the issuing ray to travel in a path substantially parallel to the lens axis.

In order to give the desired spread to the light I have provided convex flutes 16 on the incident surface A. The effect of these flutes is evident from study of Figures 3 and 4 where A' indicate points of incidence on surface A, B' indicates points of internal reflection from surface B and C' indicate the points at which the rays emerge from the surface C. The rays illustrated are indicated by reference numbers 1, 2 and 3.

Figure 4:
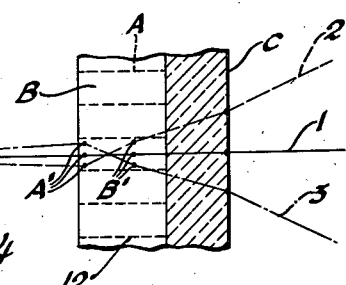
Figure 4 is a top plan view of the lens element of Figure 3.

Ray 1 lies in a plane normal to the flute surface so that after refraction and reflection it issues in a direction substantially parallel to the lens axis as best shown in Figure 4. Rays 2 and 3 strike surface A on either side of normal and cross over within the glass prior to reflection from surface B after which they continue their travel within the glass and emerge from surface C diverging at the same angle from ray 1 but on opposite sides of it. With the configuration illustrated the rays passing through any one flute will be spread on both sides of normal and substantially tangentially with respect to the curvature of the catadioptric lens elements. The consequence is that when the lighted lamp is viewed from points anywhere within the angle of spread the lens appears to be uniformly lighted, giving an effective signal.

Figure 5:
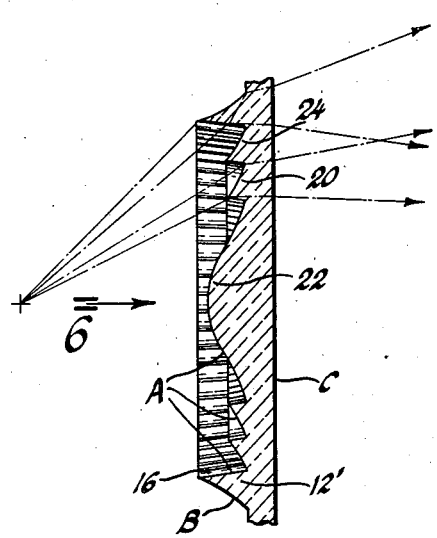
Figure 5 is a vertical section through the modified form of lens.
Figure 6:
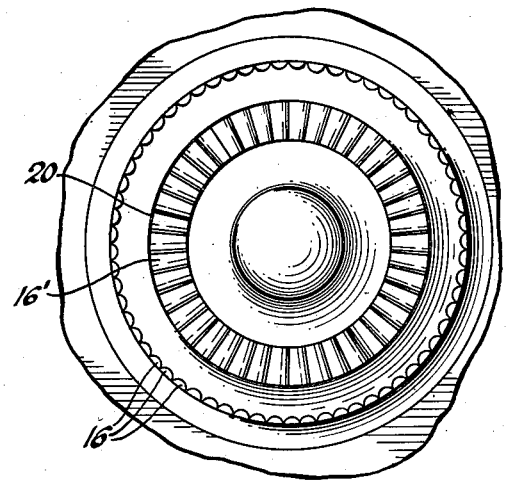
Figure 6 is a view looking in the direction of arrow 6 of Figure 5.

In the form of invention shown in Figure 5 the flutes are applied to the dioptric portion of the lens as well as to the catadioptric ring 12'. The catadioptric ring 12' is provided with flutes 16 as in the form of the invention shown in the previous figures, the only difference being that the reflecting surface B is curved as shown to give radial spread to the reflected rays in addition to the tangential spread produced by the flutes 16. Similar flutes 16' are shown applied to one of the dioptric rings indicated at 20. The incident surface A of the dioptric rings may be slightly curved as shown. The light passing through dioptric ring 20 is spread tangentially by the flutes 16' and is also spread radially as a consequence of the curvature of the incident surface A. Similar treatment could, of course, be given to the central dioptric portion 22 and the outer dioptric ring 24 if desired.

Figure 7:
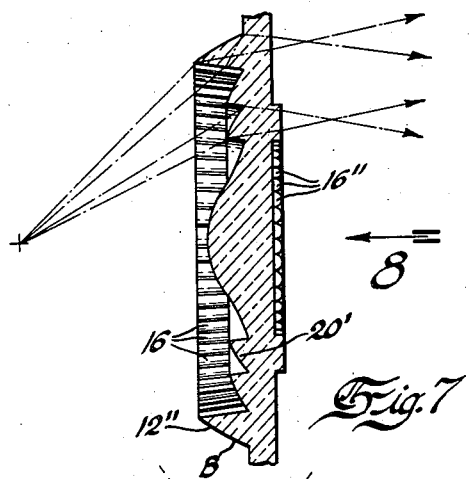
Figure 7 is a view similar to Figure 5 showing a modification.
Figure 8:
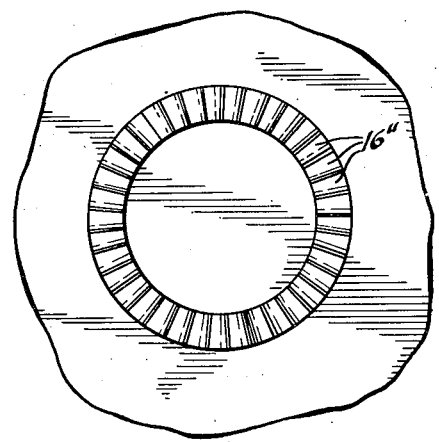
Figure 8 is a view loking in the direction of arrow 8 on Figure 7.

In the modification shown in Figures 7 and 8 tangential spread is given to the light striking the catadioptric ring 12" by providing flutes 16 on the incident surface A. Radial spread is obtained by giving a convex curvature to the reflecting surface B. The desired tangential spread is given to light passing through dioptric ring 20' by providing radial flutes 16" on the outer surface of the lens. If similar spread of all of the light passing through the dioptric portion of the lens is desired these flutes may be extended over the remainder of the dioptric portion of the lens. Similarly the light passing through the catadioptric portions of the lens may be spread tangentially by extending the flutes over these portions as well. Radial spread is obtained by convex curvature given to the incident surface of the dioptric rings as shown. An objection to the application of flutes to the outer surface of the lens is, of course, that they collect dust which interferes with light transmission.

Figure 9:
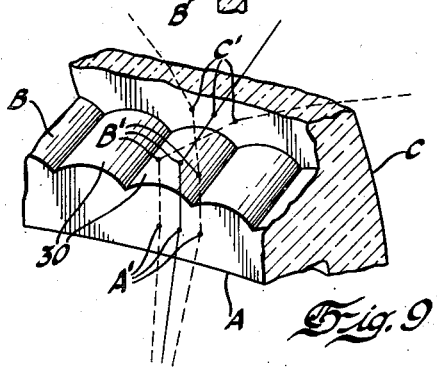
Figure 9 is a view similar to Figure 3 showing a portion of a slightly modified catadioptric lens element.

In the modification shown in Figure 9 flutes 30 are provided on the reflecting surface B of the catadioptric lens element. These flutes accomplish tangential spread of the light as in the case of the previous forms of the invention. It will be understood, of course, that the points of incidence A' are on surface A, points of reflection B' are on surface B, and points of emergence C' are on surface C. An objection to the modification shown in Figure 9 is that the fluting makes the reflecting surface quite irregular and a reflecting surface is more sensitive to inaccuracies than is a refracting surface.

The invention is capable of considerable variation. In general surfaces A, B and C may be either flat, concave or convex. The forms illustrated are preferred for automobile lamps. In other installations other general configurations may be desired to get particular lighting effects. Whatever be the general configuration of surfaces A, B and C the application of flutes as herein disclosed will accomplish the tangential spread described.

The flutes may be provided on either the incident or the reflecting or "emerging" surface as preferred. The flutes may be either convex or concave. Where the cooperating surface is curved the flutes may be flat.

The lenses may be made of any suitable material, either glass or any of the well known glass substitutes such as synthetic resins.

I claim:

1. An arcuate catadioptric lens element having an incident surface, an internally reflecting surface and a surface from which the reflected light emerges, said element having transversely curved flutes superimposed on one of the first two named surfaces for spreading the light, the axes of said flutes lying in planes substantially radial to the axis of the lens.

2. A lens comprising an arcuate catadioptric lens element having an incident surface, an internally reflecting surface and a surface from which the reflected light emerges, said incident surface being shaped to provide transversely curved flutes for spreading the light tangentially of the arc of the lens element.

3. A lens comprising an arcuate catadioptric lens element having an incident surface, an internally reflecting surface and a surface from which the reflected light emerges, said incident surface covered with contiguous transversely curved flutes extending in planes substantially radial to the axis of the lens.

4. A lens comprising a plurality of contiguous concentric arcuate catadioptric lens elements each of said elements having an inner incident surface and an outer reflecting surface, the incident surfaces of each of said lens elements being provided with transversely curved flutes arranged to spread the light tangentially of the arc of the lens element.

WILLIAM R. GORIS.